CHARLES F. PAYNE
INVENTOR

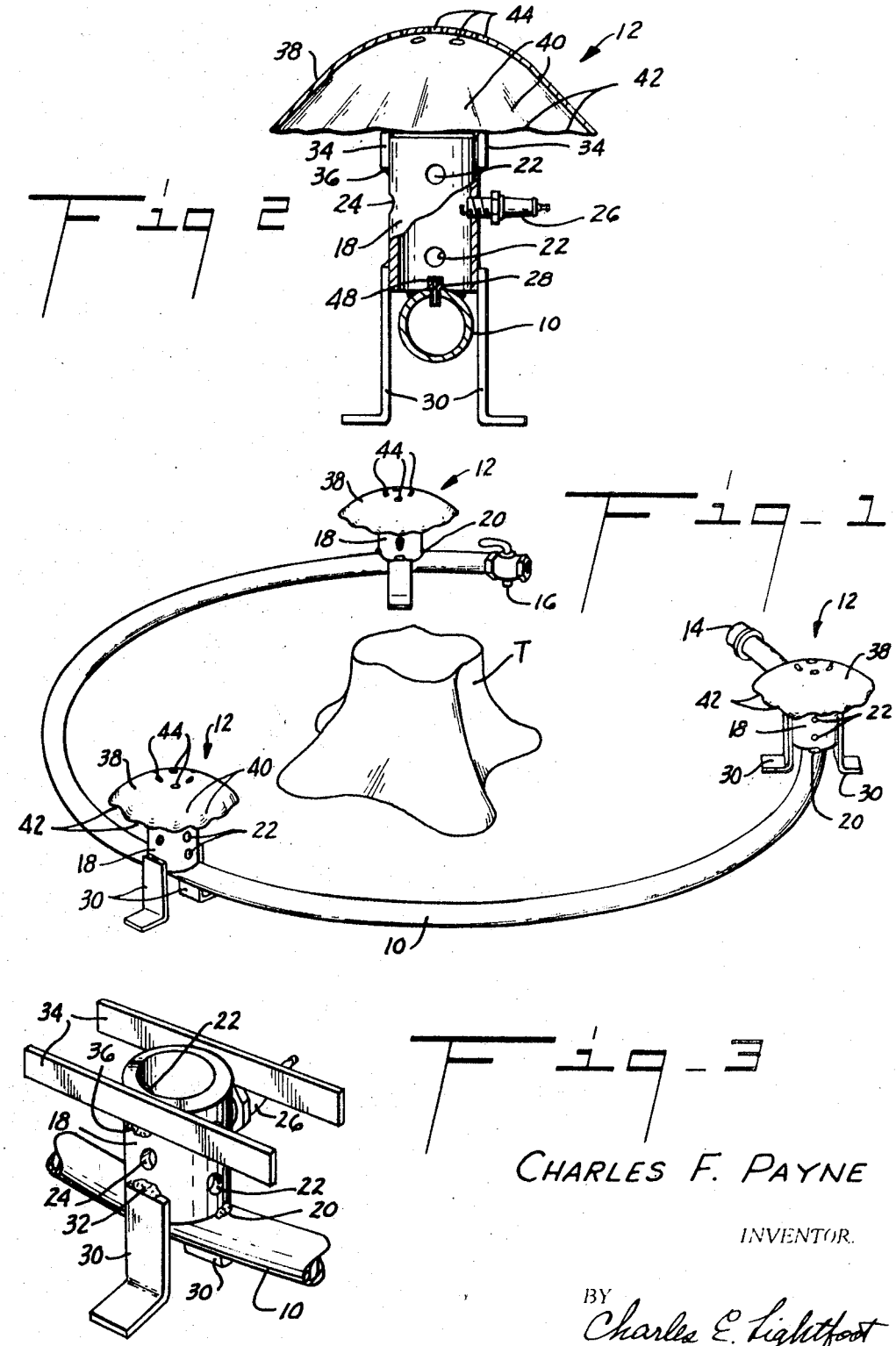

BY Charles E. Lightfoot
ATTORNEY

United States Patent Office 3,470,863
Patented Oct. 7, 1969

3,470,863
ORCHARD HEATING APPARATUS
Charles F. Payne, 11002 Plains Trail,
Austin, Tex. 78758
Filed Oct. 23, 1967, Ser. No. 677,135
Int. Cl. A01g 13/06; F23d 13/40, 15/00
U.S. Cl. 126—59.5        5 Claims

ABSTRACT OF THE DISCLOSURE

Apparatus for heating the air in orchards to prevent frost damage to fruit trees, including a fuel supply system not requiring extensive piping.

The apparatus has a fuel supply conduit shaped to be positioned about a tree in an orchard and a number of burners attached at spaced intervals to the supply conduit and each comprising a burner tube or larger diameter than the supply conduit extending axially upwardly therefrom into whose lower end fuel from the supply conduit may flow. The supply conduit is supported on the ground by legs attached to each burner tube at diametrically opposite locations spaced radially from the supply conduit. Each burner has a hollow metal hood of inverted cup shape supported on the burner tube covering the upper end thereof.

---

The invention relates to heating apparatus and more particularly to apparatus for use in the heating of orchards to prevent frost damage to fruit trees or the like.

In the growing of fruit in orchards and especially in citrus groves the temperature will occasionally fall in winter to a point at which great damage may be done due to frost.

Various attempts have been made to prevent damage of this kind, by heating the orchards by the use of expedients such as the spraying of water into the air from elevated nozzles, the burning of old rubber tires, or other makeshift methods. In general, however, such methods have not proven satisfactory due to the fact that no adequate control can be exercised over the change in temperature which is effected, and in the case of the burning of rubber tires or the use of smudge pots very unpleasant air pollution may result.

Other methods of orchard heating have been proposed, making use of relatively elaborate piping systems for supplying gas to suitable burners for heating the air. The use of piping systems has, however, proven to be inordinately expensive.

The present invention has for an important object the provision of heating apparatus for orchards, which is efficient and economical in use and wherein no extensive piping is needed.

Another object of the invention is to provide orchard heating apparatus which produces little or no air pollution and wherein independent fuel supply sources may be employed to avoid extensive piping.

A further object of the invention is the provision of orchard heating apparatus embodying independently operable heating units which are readily portable and which may be positioned in any desired pattern of distribution throughout the orchard.

A still further object of the invention is to provide orchard heating equipment which uses readily available fuel sources, which are independent of each other, whereby failure of one such source does not in any way affect the continued operation of the remaining units of the apparatus.

Briefly described the apparatus of the invention comprises a heating unit having one or more burners assembled on a common fuel supply pipe in an arrangement adapted to be positioned about a tree in an orchard, each such unit being adapted to be supplied with fuel from a separate source, and each of the burners being furnished with separate means for igniting the fuel supplied thereto.

The objects and advantages of the invention may best be understood from the following detailed description, constituting a specification of the invention, when considered in conjunction with the annexed drawings, wherein—

FIGURE 1 is a perspective view, illustrating a preferred embodiment of the invention and showing the structure and arrangement of burners of one of the heating units of the invention;

FIGURE 2 is a side elevational view, partly broken away and partly in cross-section and on a somewhat enlarged scale, showing the structure and arrangement of one of the burners of the apparatus;

FIGURE 3 is a perspective view, on a somewhat enlarged scale, of one of the burners of the apparatus with the hood removed therefrom;

Figure 4:
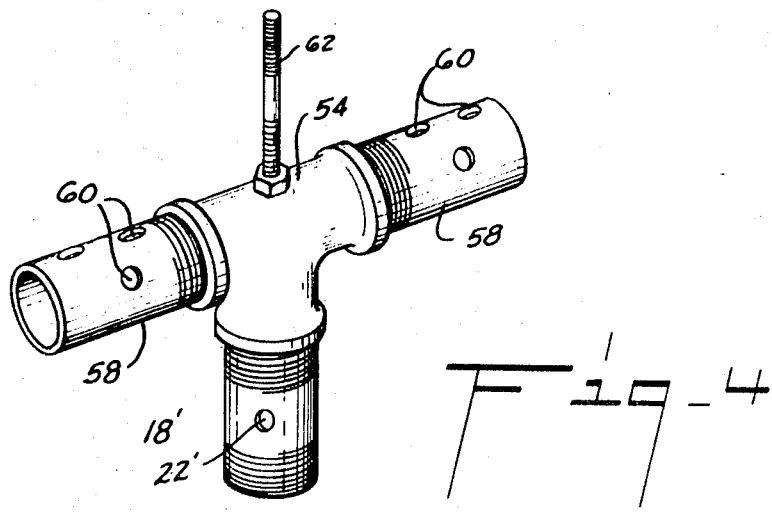
FIGURE 4 is a perspective view illustrating a somewhat modified form of the burner of the invention, showing the same separated from the remaining portions of the apparatus.

Referring now to the drawings in greater detail, the heating apparatus of the invention comprises a fuel supply conduit 10, which may be of generally circular, or other suitable configuration, adapted to be positioned about a tree in an orchard, and upon which one or more burners, generally designated 12, are mounted in spaced apart relationship.

The conduit 10 is closed at one end, as by means of a cap or plug 14, and is provided at the other end with a fuel flow control valve 16, of any convenient type, for the connection thereto of a fuel supply line from any convenient source of fuel, such as an acetylene gas generator, or the like, with which each of the heating units may be separately furnished.

Each of the burners 12 includes an open vertically disposed tubular burner member 18, whose lower end is positioned on the supply conduit and attached thereto as by means of welding, as indicated at 20. Each of the burner tubes 18 has pairs of diametrically disposed openings 22, the openings of each pair being spaced apart vertically, and an additional opening 24 positioned at a level between the openings of the pairs 22 and at a location spaced peripherally therefrom. Each of the burner tubes is also provided with an internally threaded spark plug opening, positioned opposite the opening 24, within which a conventional spark plug 26 is threadably fitted. Within the lower end of each of the burner tubes the supply conduit 10 is provided with an upwardly directed opening, within which a burner nozzle 28 is positioned, through which fuel may flow from the interior of the supply conduit into the lower portion of the burner 2, centrally thereof.

The apparatus is supported on the ground by pairs of legs 30, which may conveniently be of angle shape, having one leg thereof extended vertically and attached to the exterior of the burner thereof, as by means of welding, as indicated at 32. The legs 30 are preferably arranged in diametrically opposed positions.

Each of the burner tubes 18 is also provided at its upper end with a pair of parallel, diametrically opposite rods or bars 34, suitably attached thereto as by means of welding, as indicated at 36, these bars being at the same elevation above the fuel conduit 10.

Each of the burners has a dome like cover or hood 38, of hollow, inverted cup shape, formed with radial corrugations 40, providing a scalloped rim having downwardly opening grooves or notches 42, positioned to receive the upper edges of the rods or bars 34, to support the hood in a centralized position over the upper end of the burner 2. Each of the hoods 38 is also provided with a number of openings 44 in the top portion thereof, through which gases escape from the burner 2. The hoods 38 are preferably thick walled, and formed of a heat retaining material such as cast iron, or the like, and are of substantially larger diameter than that of the burner 2.

The rods or bars 34 are of sufficient length to extend completely across the flared opening of the hoods in the notches 42 to firmly support the hoods in position, while permitting the same to be readily lifted off when desired.

The burners are preferably designed for use with a gaseous fuel, such as acetylene, whereby each unit of the apparatus may be provided with an individual generator, thus making the equipment completely portable, each such unit being independent of any other so that failure of any unit does not substantially affect the overall heating of the area under treatment. For this purpose the nozzle 28 is provided with an opening 48, particularly designed for the most effective burning of the particular gas with which the apparatus is used, and the additional side openings 22 and 24 of the burner type provide for the ingress of air into the burner tube at locations to promote the most efficient burning of the gas.

In making use of the apparatus, constructed as described above, the apparatus may be positioned as shown in FIGURE 1 in generally surrounding relationship to a tree T, as many such units being installed in this manner in the orchard to accomplish the heating of the air therein to prevent frost damage to the trees. Each unit of the equipment is connected to an acetylene generator of conventional construction, not shown, as by means of a flexible pipe or hose connected to the valve 16, whereby the flow of fuel to the burners may be regulated.

The spark plugs 26 may be conveniently connected by a single conductor to a suitable source of electric current, the metallic supply conduit 10 being also connected to a return conductor leading to such source of current.

With the apparatus thus installed the valve 16 may be opened, the current supplied to the spark plugs to ignite the burners in the usual way.

Due to the relatively thick walled character of the hoods 38 the air above the apparatus will be heated largely by convection, so that a more uniform distribution of heat will be accomplished then would be the case with burners of the open flame type.

Figure 5:
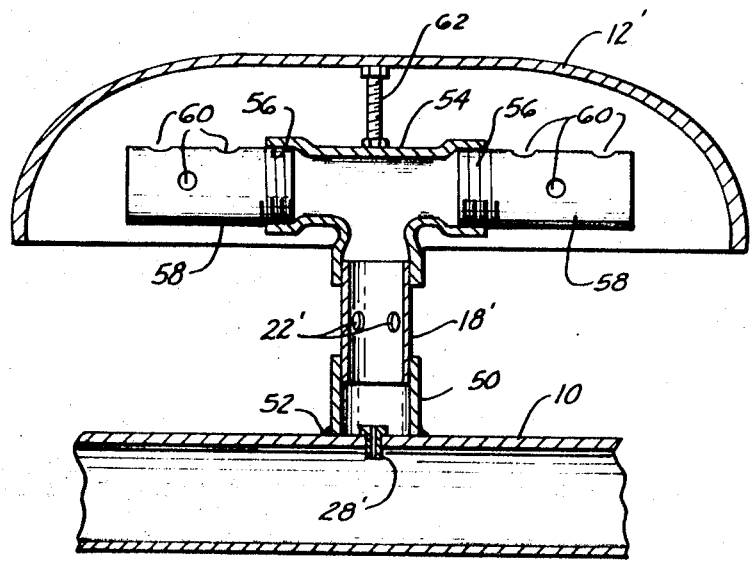
FIGURE 5 is a fragmentary side elevational view, partly in cross-section showing a portion of the apparatus of the invention with the burner of FIGURE 4 connected in position for operation.

A somewhat different form of the invention is illustrated in FIGURES 4 and 5, wherein the burner includes a vertically disposed fuel mixing and igniting tube 18', whose lower end is connected to the supply conduit 10 by means of an internally threaded fitting 50 which is welded or otherwise secured to the conduit, as indicated at 52, the fuel tube, in this instance being in the form of a pipe nipple whose end portions are externally threaded. The tube 18' is provided with air inlet openings 22', suitably located with reference to the burner nozzle 28', and the tube is connected at its upper end to a T-fitting 54 of usual design, into whose outlet openings 56 burner tubes 58 are threaded. The burner tubes 58 are open at their outer ends, and are provided with air admission openings 60.

The T-fitting 54 also has an upwardly extending, threaded stud 62 attached thereto, which is used to connect an inverted dome-shaped hood 12' to the fitting to support the hood over the burner tubes 58. The hood 12' may be similar to the hood 12, previously described, but need not be formed with the corrugations 40 or the scalloped rim portions 42, and also need not have the openings 44 of the hood 12, unless desired.

The fuel tube 18' may have a spark plug, not shown, suitably mounted therein, in the same manner and location as the plug 26 previously described, by which the fuel is ignited.

The form of the invention illustrated in FIGURES 4 and 5 is operated in the same manner as the previously described form of the apparatus.

Mixing of the fuel and air takes place in the fuel tube 18', the mixture being then ignited, whereupon the flame passes out through the burner tubes 58 to heat the hood 12' and the air above the apparatus.

It will thus be seen that the invention, constructed and used in the manner described above, provides orchard heating apparatus which is of simple design and rugged construction, wherein each unit of the equipment has its own fuel supply and by the use of which any desired pattern or arrangement of units may be achieved for the most efficient heating of the area to be treated.

It will be, of course, understood that more than one of the units of the equipment may be connected to a single source of fuel, it being apparent that the labor and expense of installation of an extensive piping system may be saved by the use of the invention.

The invention is disclosed herein in connection with a particular embodiment of the same, which is intended by way of illustration only, it being understood that various modifications can be made in the construction and arrangement of the various parts, within the spirit of the invention and the scope of the appended claims.

Having thus clearly shown and described the invention, what is claimed as new and desired to secure by Letters Patent is:

1. Orchard heating apparatus comprising
    (a) a fuel supply conduit shaped to be symmetrically disposed about and spaced away from the trunk of a tree;
    (b) a burner tube of larger diameter than that of said conduit, mounted on and extending axially upwardly from the conduit;
    (c) means including legs attached to said tube at diametrically opposite locations spaced radially from said conduit for supporting said conduit at an elevation above the ground;
    (d) a hollow metal hood of inverted cup shape supported on said tube above and covering the upper end thereof;
    (e) means for introducing fuel from the conduit into said burner tube; and,
    (f) ignition means in said tube adjacent the lower end of the tube.

2. The orchard heating apparatus of claim 1 wherein said burner tube is formed with diametrically opposite pairs of vertically spaced openings above the lower end of the tube.

3. The orchard heating apparatus of claim 1 including
    (g) spaced apart, parallel support elements attached to the upper end of said burner tube and wherein said hood is formed with radially extending corrugations forming peripherally spaced notches in the rim of the hood positioned to receive said support elements to support the hood on the tube.

4. The orchard heating apparatus of claim 1 wherein said hood is formed with centrally located openings disposed above the upper end of said tube.

5. The orchard heating apparatus of claim 1 wherein said burner tube inculdes additionally horizontally oppositely extending portions located beneath the hood whose outer ends are open.

References Cited

UNITED STATES PATENTS

| | | | |
|---|---|---|---|
| 1,245,663 | 11/1917 | Black. | |
| 2,217,536 | 10/1940 | Birrell | 126—59.5 |
| 2,286,366 | 6/1942 | Lea et al. | 126—59.5 |
| 3,200,539 | 8/1965 | Kelly | 126—59.5 X |

FOREIGN PATENTS 876,064   8/1961   Great Britain.

CHARLES J. MYHRE, Primary Examiner

U.S. Cl. X.R.

239—419.5, 427.3, 524